Figure 1:
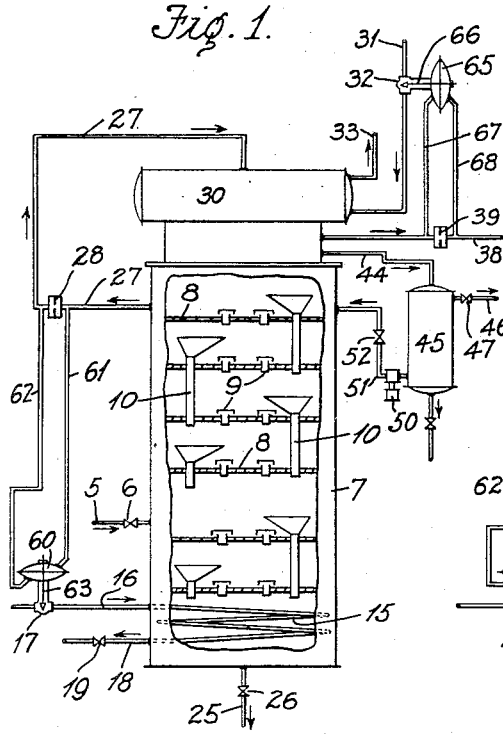

Oct. 10, 1933.                C. D. GARD                1,930,166
          METHOD AND APPARATUS FOR RECTIFICATION OF HYDROCARBONS
                          Filed July 14, 1930

INVENTOR.
Clare D. Gard
BY Philip Subkow
ATTORNEY.

Patented Oct. 10, 1933

1,930,166

UNITED STATES PATENT OFFICE 1,930,166

METHOD AND APPARATUS FOR RECTIFICATION OF HYDROCARBONS

Clare D. Gard, Los Angeles, Calif., assignor to Union Oil Company of California, Los Angeles, Calif., a corporation of California Application July 14, 1930. Serial No. 467,748

26 Claims. (Cl. 196—132)

This invention relates to methods and apparatus for distillation and fractionation of complex mixtures.

In the continuous operation of fractionating columns in the usual manner, it has been found that during the operation of the tower there is a tendency to produce a progressively increasing amount of vapors in the column and an increasing amount of reflux condensate which is returned thereto. This returned reflux is reboiled in the column, recondensed in the reflux condenser and is again returned to the column with additional reflux, freshly condensed from the vapors volatilized from incoming material. This undesirable condition is known as overloading and results in large efficiency losses. Overloading makes it very difficult to obtain proper clean-cut separation of the vapors of the desired boiling points from the bottoms in the column, and results in reducing the capacity of the column.

Overloading may be due to the application of too much heat at the base of the column or to an increase in the quantity of vapors or feed entering the column, or to too much cooling of the vapors leaving the column. Any of these conditions causes an abnormal quantity of reflux to be returned to the fractionating column with the consequent deleterious effects previously described. For instance, in a stabilizing fractionating column, unstable gasoline is fed at a constant rate, and at constant pressure and temperature to the lower part of the column. The lighter fractions separate from the heavier and pass to the fractionating section from which they are conducted to a reflux condenser. The condensate produced therein forms a reflux which is pumped back to the top of the fractionating section. The unvaporized portion descends into the lower or exhausting section of the column where it is heated to a higher temperature to exhaust all of the light fractions that are not desired in the bottoms. With constant temperature, pressure and flow control, the column will produce a constant amount of stabilized gasoline which exists from the bottom and a constant amount of light, unstabilized fractions will flow through the vapor line from the top. These conditions are theoretically ideal, but in practice variations in one or more conditions will occur which render adjustments of other conditions necessary. If, in an effort to control the overhead, too much cooling fluid is supplied to the reflux condenser, the amount of unstable gases leaving therefrom in gaseous form is reduced. The reflux passing back to the fractionating column is increased, and will contain undesirable unstabilized fractions which are returned to the fractionating column.

This increase of reflux causes an undesirable cooling all the way through the column with a consequent cooling of the bottoms. A constant temperature regulator usually placed in the bottom of the column automatically allows more heating fluid to be admitted to the bottom section of the column so that a fixed temperature is maintained for the distillation of the bottoms. Because this temperature is maintained at a fixed value and because there is more material being returned to the column, the amount of vapors evolved from the oil will be increased. The increased volume of vapors passes up through the column to the reflux condenser in which an increased amount of reflux is formed. This increased amount of reflux is returned to the column again and the cycle is repeated. This condition may continue until the column becomes overloaded with reflux which revaporizes and again ascends through the vaporizing section. It then becomes necessary to reduce the rate of feed to the column in order to properly fractionate the materials therein. The direct result of overloading, then, is to reduce the capacity of the fractionating column.

It is an object of the present invention to prevent the overloading of the column with vapors and reflux as above described. It is also an object of this invention to provide a method and apparatus to insure a constant quality bottoms from a fractionating column, especially where the quality of the feed is uniform. But, it is also desired to obtain a constant quality bottoms from a variable quality feed.

My invention comprises a method of distillation and fractionation in which an abnormality of conditions in any unit of the apparatus will automatically be readjusted by a resulting abnormality of conditions in some other unit for the purpose of returning the entire system to normal operation. The invention also comprises a method of controlling distillation and fractionation whereby the volume of vapors leaving the fractionating column and entering the reflux condenser is maintained constant by regulating the heating in proportion to such volume. My invention further comprises the aforesaid method in combination with a step in which the amount of reflux condensation is controlled by the temperature of the vapors leaving the reflux condenser. The invention also comprises the step of regulating the amount of condensation in the reflux condenser by the volume of the vapors leaving the fractionating unit, both alone and in combination with the aforesaid method. The invention furthermore comprises the aforesaid method in combination with a step in which the volume of vapors leaving the fractionating unit controls the amount of condensation in the reflux condenser and also controls the amount of reflux which enters the system. The invention furthermore comprises a distillation and fractionating system in which the temperature of the bottoms is maintained constant and the rate of feed is controlled by the volume of vapors leaving the fractionating column; the amount of cooling in the reflux condenser and the amount of reflux returning to the fractionating column likewise being regulated by the volume of vapors leaving said column is necessary or desirable.

In addition, the invention comprises apparatus in which the various improvements above identified may be applied.

Figure 2:
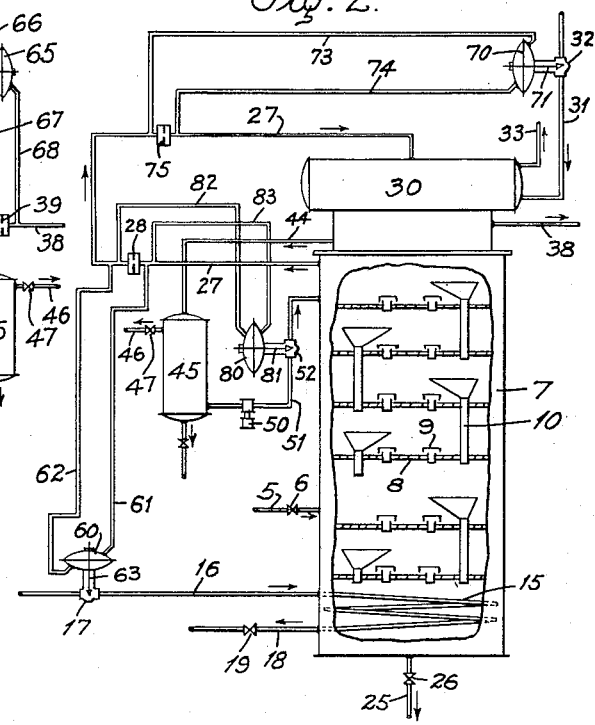
Figure 3:
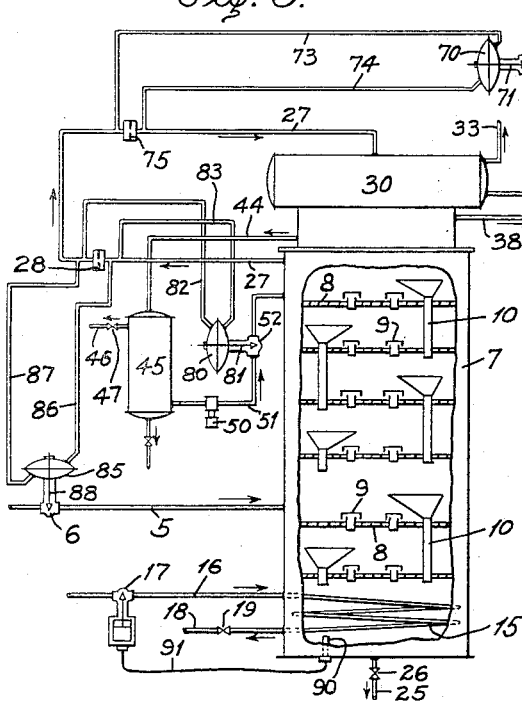
Figure 4:
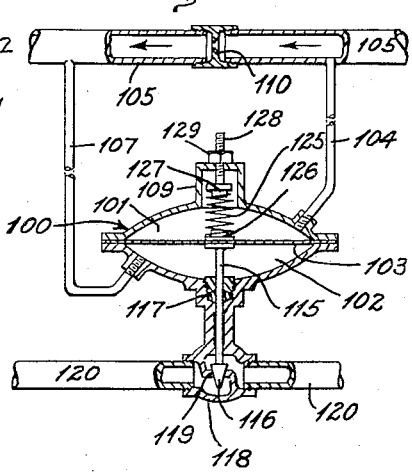

In the accompanying drawing, wherein preferred embodiments of the invention are disclosed by way of illustration:

Fig. 1 is a vertical section of a distillation and fractionation system in which the steam supply to the bottoms in the fractionating column is controlled by the rate of flow of vapors issuing from said column; and the rate of flow of the cooling agent into the reflux condenser is regulated by the rate of flow of vapors from said condenser;

Fig. 2 discloses a system which differs from Fig. 1 in the manner of control of the flow of cooling fluid to the reflux condenser, this form disclosing means to regulate cooling of the reflux condenser by means of the rate of flow of vapors from the column, and also disclosing a control for the rate of return of reflux to the column in proportion to the rate of flow of vapors exiting from the column;

Fig. 3 is a vertical section of a distillation and fractionation system in which the rate of flow of vapors from the fractionating column controls the rate of flow of fresh oil into said column, the rate of flow of reflux into the column and the degree of cooling in the reflux condenser; and Fig. 4 is an enlarged view of a vertical section of a preferred type of orifice controller.

Referring to the drawing, in which like numbers represent like parts, numeral 5 represents an inlet pipe controlled by valve 6, conducting oil or the like to fractionating column 7. This column is provided with reflux plates 8, bubble caps 9 and overflow pipes 10, in the usual manner. Heat is furnished thereto by passing steam or the like through coil 15 having inlet 16 controlled by valve 17 and outlet 18 controlled by valve 19. Column 7 is also provided with residuum outlet 25 controlled by valve 26 and with hot vapor outlet 27 through which vapors are conducted to reflux condenser 30, cooled by heat exchange with cooling material entering by pipe 31 controlled by valve 32 and leaving by pipe 33. Uncondensed vapors exit from the reflux condenser by pipe 38. Condensate is removed from reflux condenser 30 through pipe 44 which carries the reflux into storage 45 provided with outlet 46 controlled by valve 47. Reflux from storage 45 may be returned to column 7 by pump 50 situated in line 51 which is controlled by valve 52.

With more particular reference to Fig. 1, the supply of steam to steam coil 15 entering through inlet pipe 16 is controlled by means responsive to the rate of flow of vapors passing through hot vapor line 27. A preferred device of this character is orifice controller 60 connected with vapor line 27 by means of pipes 61 and 62. A reduced orifice is positioned in line 27 between the points of entrance of pipes 61 and 62 thereinto. The reduced orifice is shown schematically at 28. Controller 60 has means 63 operatively connected with steam inlet valve 17 to close said valve proportionally to the increased flow of vapors through line 27, and conversely to open said valve when the rate of flow of vapors through line 27 decreases. A more detailed description of an orifice controller of this type and of its operation is given below. The amount of cooling in the reflux condenser depends upon the rate of flow of cooling fluid passing in heat exchange relationship with the vapors passing therethrough. If desired, a control may be accomplished by orifice controller 65 connected with vapor outlet pipe 38 by pipes 67 and 68, said orifice controller having connection 66 for regulating cooling medium inlet valve 32. A reduced orifice 39 is positioned in vapor outlet pipe 38 between the points of entrance of pipes 67 and 68 thereinto. An increased rate of flow of vapors through line 38 thereby causes an increased rate of flow of cooling material through pipe 31, and conversely a decreased rate of flow of vapors causes a decrease in the flow of cooling material.

Referring to the modification of Fig. 2, the rate of heating the bottoms in fractionating column 7 is controlled by the means described in Fig. 1; but the rate of cooling in the reflux condenser, instead of being controlled by uncondensed vapor flow, is made proportional to the rate of flow of vapors through hot vapor line 27, which contains reduced orifice 75, by means of an orifice controller 70 connected to line 27 by pipes 73 and 74. Actuating connection 71 is operatively connected with cooling medium inlet valve 32. An increased rate of flow of vapors through hot vapor line 27 causes an increased rate of flow of cooling medium through line 31; and conversely, a decrease of flow in the one causes a decrease in the other. If desired, the amount of reflux to column 7 may be controlled by orifice controller 80 operatively connected with valve 52 in pipe 51 by connection 81. It is connected by pipes 82 and 83 to hot vapor line 27 in which reduced orifice 28 is positioned in the usual manner. By this means, an increased rate of flow of vapors through hot vapor line 27 causes a proportional increase in the rate of flow of reflux returning through pipe 51. The converse causes a decreased amount of reflux to be returned.

Referring to Fig. 3, orifice controller 70 controls valve 32 in cooling medium inlet pipe 31 and orifice controller 80 controls valve 52 in reflux return pipe 51 as in Fig. 2. In addition, orifice controller 85 is connected with vapor line 27 by connections 86 and 87 which have inlets on either side of reduced orifice 28. It is operatively connected by means of connection 88 with valve 6 which controls the rate of flow of incoming material to be distilled and fractionated in fractionation column 7. An increase in the flow of vapors through line 27 thereby causes a corresponding decrease in the amount of feed admitted to the column. Also, if the rate of flow of vapors in line 27 decreases, the amount of feed entering the column will be correspondingly increased. In this embodiment, column 7 is provided with thermostat 90 operatively connected with steam inlet valve 17 by connection 91 in the usual manner, whereby a constant distillation temperature is maintained in the bottoms.

With reference to Fig. 4 which discloses a preferred type of flow responsive device, particularly an orifice controller for use with my invention, diaphragm housing 100 is divided into two separate non-communicating compartments 101 and 102 by pressure responsive diaphragm 103. Compartment 101 may be connected by pipe 104 to a conduit 105 through which a fluid is to be passed. Compartment 102 likewise is connected by pipe 107 to said conduit 105. Within this conduit and placed between the points of entry of pipes 104 and 107 thereinto, there is disposed a reduced orifice 110 for the purpose of creating a pressure differential in the fluid on either side thereof. The pressure on each side of the reduced orifice will be transmitted by pipes 104 and 107 to compartments 101 and 102 respectively. The pressure differential thereby actuates pressure responsive movable diaphragm 103 which carries valve stem 115 upon which is mounted the valve 116. The valve 116 is provided to regulate the passage of fluids through pipe 120. The valve stem passes through stuffing box 117 carried on valve housing 118, and the valve closes on valve seat 119 in the usual manner. In order to compensate for the weight of the valve stem and valve which are carried by the diaphragm and depend therefrom, tension spring 125 is provided on the opposite side thereto in housing extension 109. One end of said spring is attached to the diaphragm by hook attachment 126. The other end of the spring is attached at 127 to an adjusting screw 128 which may be threaded into housing extension 109 and which may be secured by nut 129. By this means, an increase in the rate of flow of fluids through conduit 105 proportionally decreases the rate of flow of fluids past valve 116 in conduit 120 in the manner described below. Conversely, a decrease in the rate of flow through 105 proportionally increases the rate of flow past valve 116. If, instead, it is desired to increase the rate of flow of fluids past valve 116 in conduit 120 in proportion to an increased rate of flow of fluids passing through conduit 105, it will be obvious to those skilled in the art that an orifice controller may be designed in which pressure conducting pipes 104 and 107 may be connected to compartments 102 and 101 respectively. Also, by this means, a decrease in the flow through 105 will cause a proportional decrease in the flow through 120.

In operation, referring to the system generally disclosed in the drawing, a complex mixture such as oil to be distilled and fractionated enters column 7 by pipe 5 controlled by valve 6. This column may be heated by passing steam or other heating medium through heating coil 15 to which it is supplied by pipe 16 controlled by valve 17 and from which it leaves through pipe 18 controlled by valve 19. A constant rate of feed of an oil having a constant quality is desirable. The oil descends on a series of reflux plates 8 by means of overflow pipes 10 disposed in the usual manner. Vapors that are volatilized by the heat in the column rise through bubble caps 9 and contact with the descending oil in customary fashion. Bottoms are removed from the column through outlet 25 controlled by valve 26. Vapors exiting from the column pass to reflux condenser 30 by means of pipe 27. A cooling medium such as water enters through pipe 31 controlled by valve 32 for heat exchange with the oil vapors therein and exits by line 33. Uncondensed vapors issuing from the reflux condenser exit through pipe 38. Condensates produced therein are conducted by pipe 44 into reflux storage 45 from which excess condensate is removed by pipe 46 controlled by valve 47. Pump 50 supplies reflux from storage 45 to column 7 through pipe 51 controlled by valve 52.

As previously described, fractionating columns have a tendency to overload with reflux and vapors, in which case too large quantities of reflux must be returned for reboiling in order to separate the fractions desired in vapor form. By this invention, conditions are controlled to prevent the occurrence of overloading. An abnormality of conditions in any unit of the apparatus can be automatically readjusted by a resulting abnormality of conditions in some other unit.

Referring to Fig. 1, the presence of excessive amounts of reflux in the column causes a greater amount of vaporization therein, and a consequent increased flow of hot vapors through vapor line 27. This increased flow causes orifice controller 60 and connection 63 to correspondingly close valve 17, thereby reducing the amount of steam entering steam coil 15. The operation of a preferred type of orifice controller is described below in more detail. The temperature in the column is thereby reduced and the rate of flow of vapors through line 27 is brought back to normal. Likewise, an increased flow of vapors issuing from reflux condenser 30 through line 38 may be employed to exert an action on an orifice controller 65 operatively connected to actuate valve 32. This valve is opened correspondingly to allow a greater flow of cooling medium into the reflux condenser. More fractions will then be condensed with a corresponding decrease in the amount of vapors issuing from the condenser. By means of these controls, the tendency to overload the column is avoided. This method of controlling presupposes a constant quality in the feed material.

In Fig. 2, the rate of steam input into the heating coil 15 is controlled through valve 17 in a manner similar to that described above. In some cases it may be more desirable to control the cooling in the reflux condenser by the rate of flow of vapors entering the condenser rather than by the rate of flow of vapors leaving therefrom as in Fig. 1. When conditions are unbalanced and overloading occurs, the higher rate of flow of vapors exiting from the column effects an action on orifice controller 70 causing valve 32 to open in order to allow more cooling fluid to pass through the condenser. Where desirable to control the rate of reflux returning to the column, orifice controller 80 causes valve 52 to open when the rate of flow of vapors in line 27 is excessive, thereby allowing more reflux to enter. This causes a cooling action in the column and reduces the amount of vapors leaving therefrom. Thus the system tends to return to normal. At the same time control 60, 63 functions to reduce steam through valve 17.

In reference to Fig. 3, the temperature of the bottoms is maintained constant by means of thermostat 90 operatively connected by line 91 to steam inlet valve 17. If the temperature of the bottoms decreases, valve 17 is correspondingly opened, and, conversely, upon an increase of temperature, steam inlet valve 17 is correspondingly closed. The control of the flow of cooling medum into the condenser and of the rate of flow of reflux back to the column has previously been described. If overloading tends to occur in the column, the increased rate of flow of vapors through line 27 also causes orifice controller 85 to proportionally close feed inlet valve 150

6, thereby decreasing the rate of flow of feed into the column. The amount of vapor volatilized therein is decreased as well as the rate of flow of vapors through line 27. When the conditions tending to overload the column have been adjusted, valve 6 may then be correspondingly opened for normal operation. This form may be used for a variable quality feed.

In reference to Fig. 4, the following description of the use of my preferred form of orifice controller illustrates one manner in which the rate of flow of fluids passing through a pipe such as conduit 120 may be decreased proportionally to the rate of flow of fluids passing through another pipe, such as conduit 105. Fluids under pressure, flowing through pipe 105 in the direction of the arrows, pass through reduced orifice 110, and consequently there is a less pressure on the side past the reduced orifice than on the inlet side. This creates a pressure differential in the fluid on either side thereof. Pipes 104 and 107 transmit the pressure on each side of the reduced orifice to non-communicating compartments 101 and 102 respectively. The pressure responsive, movable diaphragm 103 has first been adjusted for normal conditions by adjustment of adjusting screw 128 to which tension spring 125 is attached. The other end of the tension spring is attached to the diaphragm. Any increase in the rate of flow of fluid through conduit 105 causes a corresponding increase in the pressure differential and the pressure in compartment 101 will exceed that in compartment 102. This pressure difference actuates the movable diaphragm and correspondingly lowers the valve stem and valve attached thereto. The rate of flow of fluid passing valve 116 in conduit 120 is thereby proportionally decreased. Conversely, it is obvious that a decrease in the rate of flow of fluids in conduit 105 will cause a proportional increase in the rate of flow of fluids passing through conduit 120. By using this same type of orifice controller and by connecting pressure conducting pipe 104 to compartment 102 and pressure conducting pipe 107 to compartment 101 it is likewise possible to reverse the above procedure and thereby cause an increased flow of fluids through conduit 120 in proportion to an increased flow of fluids through conduit 105. Conversely, it is obvious that a decreased rate of flow of fluids through conduit 105 will then cause a decreased rate of flow of fluid through conduit 120.

The above disclosures are merely illustrative of preferred embodiments of my invention and are not to be taken as limiting, since many variations thereof may be made within the scope of the following claims without departing from the spirit of the invention.

I claim:

1. A method of condensing vapors comprising cooling said vapors by heat exchange with a cooling fluid and automatically regulating the rate of flow of said cooling fluid by the rate of flow of uncondensed vapors leaving the condenser.

2. A method of condensing vapors comprising cooling said vapors by heat exchange with a cooling fluid and automatically regulating the rate of flow of said cooling fluid, such regulation being made in accordance with the velocity of the vapors flowing to the condenser.

3. A method of distillation comprising vaporizing a liquid without substantial decomposition thereof and then condensing resultant vapors which comprises automatically regulating the rate of supply of heat for vaporization in accord with the velocity of the vapors flowing to the condensing stage so that when the velocity of the vapors changes from a desired value the supply of heat is automatically changed so as to bring the velocity of the vapors back to a desired value.

4. A method of controlling fractionation of vapors by returning reflux condensate to the fractionation zone comprising automatically regulating the rate of return of said reflux to said fractionation zone by the rate of flow of vapors leaving said fractionation zone.

5. An apparatus for condensing vapors comprising a condenser and automatic means to regulate the rate of flow of cooling medium to said condenser by the rate of flow of uncondensed vapors leaving said condenser.

6. An apparatus for condensing vapors comprising a condenser and automatic means to regulate the rate of flow of cooling medium to said condenser by the rate of flow of vapors entering said condenser.

7. Apparatus for distillation and condensation without substantial decomposition of the material distilled, comprising a still, heating means therefor, a condenser, vapor conducting means from said still to said condenser, and means to automatically regulate the rate of heat supplied by said heating means to the still in accord with the velocity of the vapors flowing to the condenser so that when the velocity of the vapors changes from a desired value the supply of heat is automatically changed so as to bring the velocity of the vapors back to a desired value.

8. Apparatus for fractionation of vapors comprising a fractionator, a condenser, means to conduct uncondensed vapors from said fractionator to said condenser, means to return condensed reflux from said condenser to said fractionator and means to automatically regulate the rate of return of said reflux to said fractionator by the rate of flow of vapors leaving said fractionator.

9. Apparatus for distillation and fractionation comprising a still having a liquid inlet, a fractionator, means to conduct vapors from said still to said fractionator, a vapor outlet for said fractionator, and means to automatically regulate the rate of flow of feed through the inlet of said still by the rate of flow of vapors leaving through the vapor outlet of said fractionator.

10. Method for distillation and fractionation which comprises introducing liquid into a vaporizing zone, fractionating the resulting vapors in a fractionating zone, removing the vapors from the fractionating zone and condensing them to form a reflux by heat exchange with a cooling fluid, introducing the reflux into the fractionating zone and withdrawing the uncondensed vapor from the condensing zone and regulating the introduction of liquid into the vaporizing zone and the return of reflux to the fractionating zone by the rate of flow of vapors issuing from the fractionating zone.

11. Method for distillation and fractionation which comprises introducing liquid into a vaporizing zone, fractionating the resulting vapors in a fractionating zone, removing the vapors from the fractionating zone and condensing them to form a reflux by heat exchange with a cooling fluid, introducing the reflux into the fractionating zone and withdrawing the uncondensed vapor from the condensing zone and regulating the return of reflux to the fractionating zone and the flow of cooling fluid to the condensing zone by the rate of flow of vapors leaving the fractionating zone.

12. Method for distillation and fractionation which comprises introducing liquid into a vaporizing zone, fractionating the resulting vapors in a fractionating zone, removing the vapors from the fractionating zone and condensing them to form a reflux by heat exchange with a cooling fluid, introducing the reflux into the fractionating zone and withdrawing the uncondensed vapor from the condensing zone and regulating the rate of flow of liquid to the vaporizing zone and the return of reflux to the fractionating zone and the flow of cooling fluid to the condensing zone by the rate of flow of the vapors issuing from the fractionating zone and entering the condensing zone.

13. A method of distillation which comprises vaporizing a liquid, fractionating said vapor in a fractionating zone, condensing vapors leaving said fractionating zone in a condensing zone to form a reflux by heat exchange with a cooling fluid, returning reflux to said fractionating zone, regulating the rate of flow of said cooling fluid in response to the rate of flow of vapors leaving the fractionating zone.

14. A method of distillation which comprises vaporizing a liquid by heat exchange with a heating fluid, fractionating said vapor in a fractionating zone, condensing vapors leaving said fractionating zone in a condensing zone to form a reflux, by heat exchange with a cooling fluid, regulating the rate of flow of the cooling fluid in response to the rate of flow of the vapors leaving the fractionating zone and entering the condensing zone, returning reflux to said fractionating zone, regulating the rate of flow of the heating fluid in response to the rate of flow of vapors leaving the fractionating zone.

15. A method of distillation and fractionation which comprises heating a liquid to vaporize the liquid in a vaporizing zone, fractionating the vapors in a fractionating zone in which a reflux is passed in contact with the vapors, regulating said heating and the reflux by the rate of flow of vapors issuing from said fractionating zone.

16. A method of distillation which comprises heating the liquid to vaporize the same in a vaporizing zone, fractionating the vapors in a rectifying zone, and condensing vapors issuing from the rectifying zone to form a reflux by heat exchange with the cooling fluid, returning the reflux to the rectifying zone, controlling the heating in the vaporizing zone, the return of reflux to the rectifying zone and the heat exchange with the cooling fluid in the condensing zone in response to the rate of flow of vapors issuing from the rectifying zone.

17. A method of distillation which comprises vaporizing a liquid to form vapors, rectifying the vapors, condensing the vapors resulting from said rectification by heat exchange with cooling fluid and withdrawing the uncondensed vapors from the condensing zone and controlling the rate of flow of said cooling fluid by the rate of flow of vapors issuing from the condensing zone.

18. A method of distillation which comprises vaporizing a liquid to form a vapor, rectifying the vapors, condensing the vapors resulting from said rectification by heat exchange with a cooling fluid to form a reflux and return the reflux to said rectification and withdrawing the uncondensed vapors from the condensing zone and controlling the condensation by automatically regulating the rate of flow of said cooling fluid in response to the rate of flow of vapors issuing from the condensing zone.

19. A method of distillation which comprises heating the liquid to vaporize the same by heat exchange with a heating fluid in a vaporizing zone, fractionating the vapors in a rectifying zone, passing vapors from the rectifying zone to a condensing zone, condensing the vapors in the condensing zone by heat exchange with a cooling fluid to form a reflux, returning the reflux to the rectifying zone and controlling the heating in the heating zone by automatically regulating the flow of heating fluid in response to the rate of flow of the vapors issuing from the rectifying zone and controlling cooling in the condensing zone by automatically regulating the rate of flow of cooling fluid in response to the rate of flow of vapors issuing from the condensing zone.

20. An apparatus for distillation, comprising a vaporizer, a fractionator connected thereto and a condenser, a vapor line connecting the fractionator and condenser, a line for introducing liquid to be distilled into the vaporizer, a line for passing cooling fluid through the condenser, a line for returning reflux from the condenser to the fractionator, a flow-responsive device positioned in the vapor line leading from the fractionator to the condenser, a valve in the liquid supply line leading to the vaporizer, a valve in the reflux return line, and a valve in the cooling liquid supply line, and means for operatively connecting said valve to the flow-responsive device in the vapor line leading from the fractionator to the condenser whereby said valves are operated in response to the rate of flow of vapors in said vapor line.

21. An apparatus for distillation comprising a vaporizer, a fractionator, and a condenser, vapor connections between said vaporizer and said fractionator, a vapor conduit connecting said fractionator and the condenser, a cooling fluid supply line to said condenser, a valve in said line, a flow responsive device in said vapor conduit, and means for operatively connecting said valve to said flow responsive device whereby the rate of flow of cooling fluid is controlled in response to the rate of flow of vapors in the vapor conduit.

22. An apparatus for distillation which comprises a vaporizer, heating means for said vaporizer, a fractionator, a liquid conduit to said fractionator to introduce a reflux into said fractionator, a vapor line from said fractionator, a regulator in said heating means, and a valve on said reflux line, a flow responsive device in the vapor line to the fractionator, means for operatively connecting the regulator and valve and the flow responsive device to control the heating and the introduction of reflux in response to the flow of vapors in the vapor line.

23. An apparatus for distillation which comprises a vaporizer, a fractionator and a condenser connected together by vapor conduits, heating means for the vaporizer, a cooling fluid line for the condenser, a reflux return line from the condenser to the fractionator, a valve for regulating flow of heating fluid to the heating means, a valve in the cooling fluid flow line, and a valve in the reflux return line, a flow responsive device in the vapor conduit from the fractionator to the condenser, means for operatively connecting said valves and said flow responsive device whereby the valves are operated in accordance with the flow of vapors through the vapor line.

24. An apparatus for distillation which comprises a vaporizer, a rectifier and a condenser, vapor lines connecting said vaporizer, rectifier and condenser, a vapor off-take from the condenser, a cooling fluid supply line, a valve in said line, a flow responsive device in the vapor line connecting the fractionator and the condenser, means for operatively connecting the device and said valve to operate said valve in response to the flow of vapors in the vapor line connecting the fractionator and condenser.

25. A distillation apparatus comprising a vaporizer, a fractionator and a condenser, vapor conduits connecting the same, a cooling fluid line connected to the condenser, a liquid return line from the condenser to the fractionator, heating means for the vaporizer, a regulating means on the heating means, a valve on the liquid return line to the fractionator, and a valve on the cooling liquid supply line, a vapor off-take from the condenser, a flow responsive device in the vapor line connecting the fractionator and the condenser, means operatively connecting the said flow responsive device with the regulating means on the heating means whereby the vaporizer is heated in response to the rate of flow of the vapors in the vapor conduit connecting the fractionator and the condenser, a flow responsive device in the vapor off-take from the condenser, means for operatively connecting the said last mentioned flow responsive device and the valve on the cooling fluid supply line whereby the condensation is controlled in response to the rate of flow of vapors in the vapor off-take from the condenser.

26. A method of distillation which comprises vaporizing a liquid, fractionating said vapor in a fractionating zone, condensing vapors leaving said fractionating zone in a condensing zone to form a reflux, by heat exchange with a cooling fluid, regulating the rate of flow of the cooling fluid in response to the rate of flow of the vapors leaving the fractionating zone and entering the condensing zone and returning reflux to said fractionating zone.

CLARE D. GARD.